(12) United States Patent
Zhang et al.

(10) Patent No.: US 12,703,238 B2
(45) Date of Patent: Aug. 11, 2026

(54) IN-WHEEL ELECTRIC MOTOR DRIVE SYSTEM

(71) Applicant: Schaeffler Technologies AG & Co. KG, Herzogenaurach (DE)

(72) Inventors: Bin Zhang, Shanghai (CN); Shiwen Shi, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 229 days.

(21) Appl. No.: 18/689,018

(22) PCT Filed: Sep. 6, 2021

(86) PCT No.: PCT/CN2021/116669
§ 371 (c)(1),
(2) Date: Mar. 4, 2024

(87) PCT Pub. No.: WO2023/029037
PCT Pub. Date: Mar. 9, 2023

(65) Prior Publication Data

US 2024/0399850 A1 Dec. 5, 2024

(51) Int. Cl.
*B60K 7/00* (2006.01)
*H02K 5/22* (2006.01)

(52) U.S. Cl.
CPC ........... *B60K 7/0007* (2013.01); *H02K 5/225* (2013.01)

(58) Field of Classification Search
CPC ......... H02K 5/22; H02K 5/225; B60K 7/0007
See application file for complete search history.

(56) References Cited

U.S. PATENT DOCUMENTS 6,081,056 A * 6/2000 Takagi ..................... H02K 5/08 310/43
2005/0204537 A1* 9/2005 Reed ...................... B60K 6/445 29/469

(Continued)

FOREIGN PATENT DOCUMENTS

CN 102390253 A 3/2012
CN 207117333 U 3/2018

(Continued)

OTHER PUBLICATIONS

China National Intellectual Property Administration, International Search Report received in International Application No. PCT/2021/116669, Jun. 13, 2022, 4 pages.

*Primary Examiner* — Eric Johnson
(74) *Attorney, Agent, or Firm* — Suiter Swantz IP

(57) ABSTRACT

Provided is an in-wheel electric motor drive system, comprising: a housing, which is formed with a wiring cavity(S), a first channel (111) and a second channel (112), wherein both the first channel (111) and the second channel (112) are in communication with the wiring cavity(S), the first channel (111) allows a first connection end (41) of an electric motor busbar (4) to be inserted into the wiring cavity(S), and the second channel (112) allows a second connection end (51) of a power supply connector (5) to be inserted into the wiring cavity(S); a wiring support (2, 2'), which is mounted into the wiring cavity(S) and fixed to the housing, wherein the wiring support (2, 2') is formed with a mounting hole (2h); and a connection assembly (3), which is used for electrically connecting the first connection end (41) extending into the mounting hole (2h) and the second connection end (51) extending to a position above the same mounting (Continued)

hole (2h) together. With such an arrangement, the assembly process is simplified, the assembly cost is saved on, and the space occupied is reduced.

18 Claims, 5 Drawing Sheets

(56) References Cited

U.S. PATENT DOCUMENTS

| | | | | |
|---|---|---|---|---|
| 2012/0212089 | A1* | 8/2012 | Sakurada | H02K 5/225 310/71 |
| 2020/0266680 | A1* | 8/2020 | Fujimoto | H02K 5/225 |

FOREIGN PATENT DOCUMENTS

| | | | |
|---|---|---|---|
| CN | 110022029 | A | 7/2019 |
| WO | 2016082628 | A1 | 6/2016 |
| WO | 2016082629 | A1 | 6/2016 |

* cited by examiner

IN-WHEEL ELECTRIC MOTOR DRIVE SYSTEM

CROSS-REFERENCE TO RELATED APPLICATION

The present application is the U.S. National Phase of PCT Patent Application Number PCT/CN2021/116669, filed on Sep. 6, 2021, the entire disclosure of which is incorporated by reference herein.

TECHNICAL FIELD

The present application relates to an electric connection structure inside a vehicle, in particular to an electric connection structure for an electric motor in an in-wheel electric motor drive system of a vehicle.

BACKGROUND ART

In the prior art, new energy motor vehicles such as electric vehicles integrate a drive electric motor, a planetary gear reducer, a wheel bearing, a braking system, etc. in a vehicle wheel space to form an in-wheel electric motor drive system, in which the drive electric motor can directly drive vehicle wheels without the need of a transmission and a drive shaft, and the drive electric motor needs to obtain electrical energy from a control unit through a three-phase power cord.

FIG. 1A shows a structure of an in-wheel electric motor drive system. As shown in FIG. 1A, the in-wheel electric motor drive system comprises a housing (comprising a housing cover 10 and a housing body 20), a drive electric motor 30, a planetary gear reducer 40 and an output shaft (flanged shaft) 50, etc., which are assembled together. Both the drive electric motor 30 and the planetary gear reducer 40 are accommodated in a mounting space formed by surrounding of the housing cover 10 and the housing body 20. Torque generated by the drive electric motor 30 can be transmitted to the output shaft 50 via the planetary gear reducer 40 for driving the vehicle wheels to rotate. In the operation process of the drive electric motor 30, electrical energy needs to be continuously supplied to the drive electric motor 30. As shown in FIG. 1B, electric motor busbars 301 of the drive electric motor 30 are electrically connected to power supply connectors 60 via conductive connecting pieces 70 in a bent shape. The electric motor busbars 301 are fixedly connected to the conductive connecting pieces 70 through first fixing pieces 80, and the power supply connectors 60 are fixedly connected to the conductive connecting pieces 70 through second fixing pieces 90. The conductive connecting pieces 70 are made of a conductive material such as copper. The first fixing pieces 80 and the second fixing pieces 90 may be fixing bolts.

Although the electric motor busbars 301 and the power supply connectors 60 can be electrically connected together by using the above solution, there are the following defects. Since the conductive connecting pieces 70 are separate components, in the process of assembling the conductive connecting pieces 70 and the electric motor busbars 301 together with each other, the conductive connecting pieces 70 may generate undesired misalignment, thereby making it difficult to assemble the conductive connecting pieces 70 on the power supply connectors 60. Furthermore, in order to meet the requirement of an operation space that allows the use of tools for the process of assembling the conductive connecting pieces 70 and the electric motor busbars 301 and for the process of assembling the conductive connecting pieces 70 and the power supply connectors 60, a wiring cavity needs to be large enough, thereby causing a waste of space.

SUMMARY OF THE INVENTION

The present application has been made in view of the defects of the prior art as described above. The objective of the present application is to provide a novel in-wheel electric motor drive system, in which an electric connection structure for an electric motor is simple in assembly process, reduces assembly cost, and can reduce the volume of the wiring cavity provided to allow operation of assembly tools, compared to the electric connection structure described in the above background art.

To achieve the above disclosure objective, the present application adopts the following technical solutions.

The present application provides an in-wheel electric motor drive system as follows, comprising: a housing, which is formed with a wiring cavity, a first channel and a second channel, wherein both the first channel and the second channel are in communication with the wiring cavity, the first channel allows first connection ends of electric motor busbars of the in-wheel electric motor drive system to be inserted into the wiring cavity, and the second channel allows second connection ends of power supply connectors to be inserted into the wiring cavity; a wiring support, which is mounted into the wiring cavity and fixed to the housing, wherein the wiring support is formed with mounting holes; and connection assemblies, which are used for electrically connecting the first connection ends extending into the mounting holes and the second connection ends extending to positions above the same mounting holes together.

In one optional solution, the connection assemblies comprise first connecting pieces and second connecting pieces, the first connecting pieces are inserted into the mounting holes in a mode of being coaxial with the mounting holes, and penetrate through the first connection ends, so as to fix the first connection ends to the wiring support and enable the first connecting pieces to be electrically connected with the first connection ends, and the second connecting pieces are used for penetrating through the second connection ends and are inserted into the first connecting pieces in a mode of being coaxial with the first connecting pieces, so as to fix the second connection ends to the first connecting pieces and enable the first connecting pieces to be electrically connected with the second connection ends.

In another optional solution, the wiring support comprises internal threaded sections located at the bottoms of the mounting holes, and the first connecting pieces are formed with external threads which are in threaded engagement with the internal threaded sections.

In another optional solution, the wiring support comprises a support body and insertion pieces, the internal threaded sections are arranged in the insertion pieces, the insertion pieces and the support body are integrally formed, or the insertion pieces are manufactured independently of the support body and fixed to the support body.

In another optional solution, the first connecting pieces have threaded holes that open upward, and the second connecting pieces are formed with external threads used for being in threaded engagement with the threaded holes.

In another optional solution, the in-wheel electric motor drive system further comprises first sealing rings and second sealing rings, wherein the first sealing rings are arranged between the wiring support and the housing, and the second sealing rings are arranged between the connection assemblies and the wiring support, so that space where the first connection ends are located and space where the second connection ends are located are hermetically separated by the first sealing rings and the second sealing rings.

In another optional solution, the first channel and the second channel extend along a horizontal direction, and the mounting holes extend along a vertical direction.

In another optional solution, the housing comprises a housing body and a housing cover, the housing body is formed with a mounting opening open toward one side, and the housing cover is fixed to the housing body and closes the opening of the housing body, so that space for mounting a drive electric motor of the in-wheel electric motor drive system is formed by surrounding of the housing body and the housing cover, and the wiring cavity is formed in the housing cover.

In another optional solution, the housing cover comprises a cover body and a wiring cavity cover, the cover body is provided with an opening which is in communication with the wiring cavity, the wiring cavity cover is mounted on the cover body and can be opened and closed in a controlled mode, thereby enabling the opening to be opened and closed; and the wiring cavity cover is further provided with a breather valve, and the breather valve can enable, in the controlled mode, the wiring cavity to be in communication with external space.

In another optional solution, the wiring support comprises three mounting holes arranged side by side for enabling three sets of corresponding electric motor busbars and power supply connectors to realize electric connection.

By adopting the above technical solutions, the present application provides a novel in-wheel electric motor drive system, comprising a housing, a wiring support and connection assemblies. The housing is formed with a wiring cavity, a first channel and a second channel, and both the first channel and the second channel are in communication with the wiring cavity. The first channel allows first connection ends of electric motor busbars of the in-wheel electric motor drive system to be inserted into the wiring cavity, and the second channel allows second connection ends of power supply connectors to be inserted into the wiring cavity. The wiring support is mounted into the wiring cavity and fixed to the housing, and the wiring support is formed with mounting holes. The connection assemblies electrically connect the first connection ends extending into the mounting holes and the second connection ends extending to positions above the same mounting holes together.

In this way, since the adoption of separate conductive connecting pieces described in the background art is avoided, the process of adjusting such conductive connecting pieces is omitted, thereby simplifying the assembly process, enabling the assembly process to be easily completed, and reducing the assembly cost. Moreover, since the assembly process is simplified and no extra space for operating tools is required, the volume of the wiring cavity can be reduced. Furthermore, by adopting the above structure, the overall electric connection structure is compact, and the space occupied by the electric connection structure itself is reduced. Moreover, it is not necessary to use a pair of plug connectors near the wiring cavity, so that the component cost can be reduced.

DESCRIPTION OF REFERENCE NUMERALS

Figure 1A:
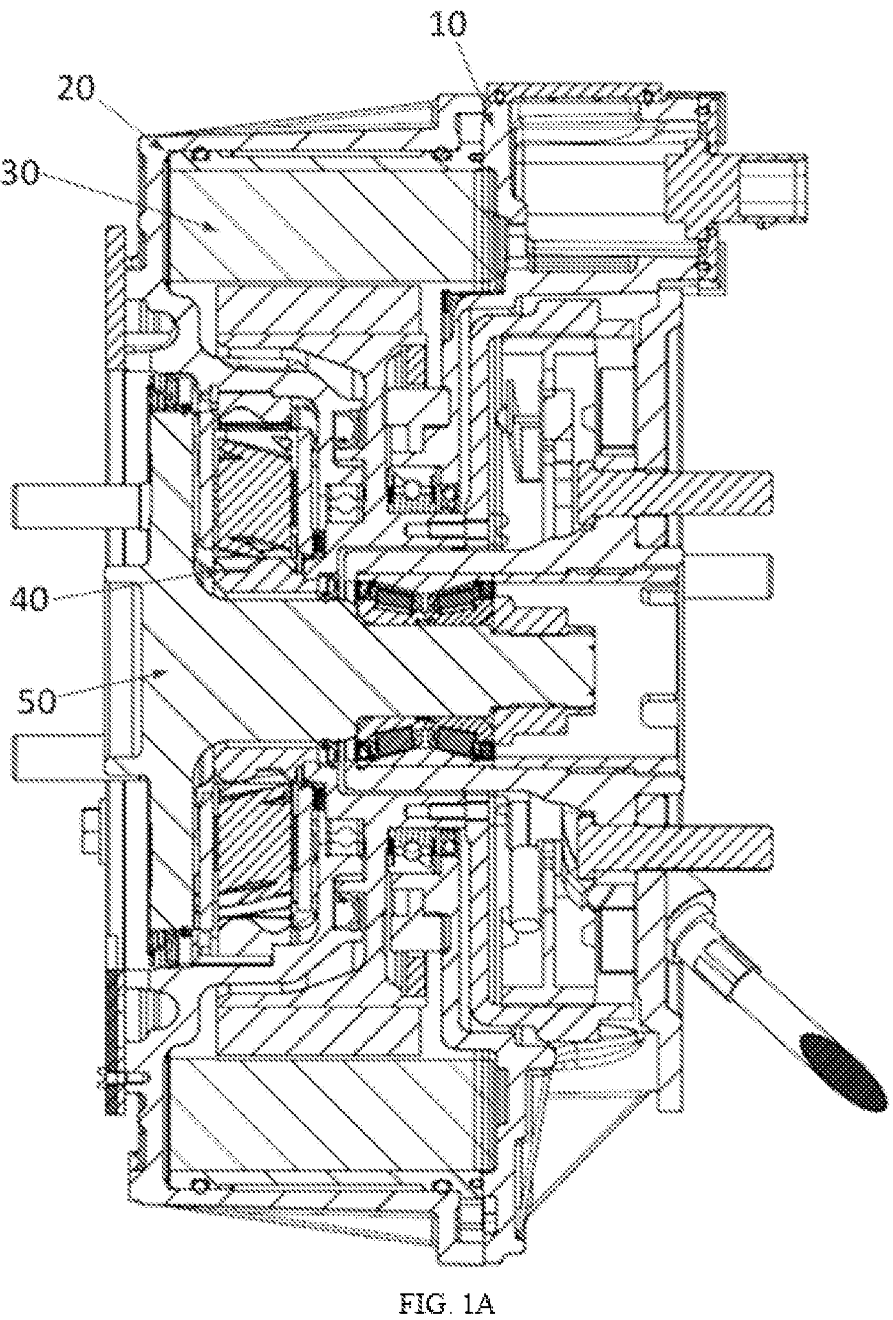
FIG. 1A is a schematic cross-sectional view showing a structure of an in-wheel electric motor drive system.
Figure 1B:
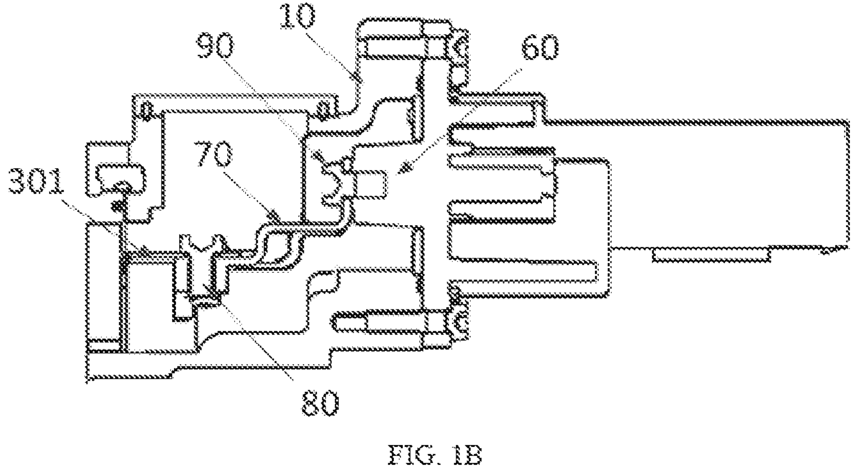
FIG. 1B is a schematic cross-sectional view showing an electric connection structure capable of being used in an electric motor of an in-wheel electric motor drive system in FIG. 1A, in which cross-section lines are omitted.

10 Housing cover 20 Housing body 30 Drive electric motor 301 Electric motor busbar 40 Planetary gear reducer 50 Output shaft 60 Power supply connector 70 Conductive connecting piece 80 First fixing piece 90 Second fixing piece 1 Housing cover 11 Cover body 111 First channel 112 Second channel 12 Wiring cavity cover 121 Breather valve 2, 2' Wiring support **2*h* Mounting hole 21, 21' Support body 211 Upper partition wall 22, 22' First insertion piece 23 Second insertion piece 3 Connection assembly 31 First connecting piece 32 Second connecting piece 4 Electric motor busbar 41 First connection end 5 Power supply connector 51 Second connection end 61 First sealing ring 62** Second sealing ring S Wiring cavity V Vertical direction H Horizontal direction.

DETAILED DESCRIPTION OF EMBODIMENTS

Specific embodiments of the present application will be described in detail below with reference to the accompanying drawings of the specification. It should be understood that these specific descriptions are only used to teach those skilled in the art how to implement the present application, and are neither intended to be exhaustive of all possible ways of the present application nor to limit the scope of the present application.

In summary, the structure of the in-wheel electric motor drive system according to the present application is roughly the same as that of the in-wheel electric motor drive system described in the above background art. The main improvement of the in-wheel electric motor drive system according to the present application lies in the adjustment of the electric connection structure for the electric motor. Hereinafter, an in-wheel electric motor drive system according to an embodiment of the present application will be described, and the configuration of an electric connection structure thereof for an electric motor will be mainly described.

Figure 2:
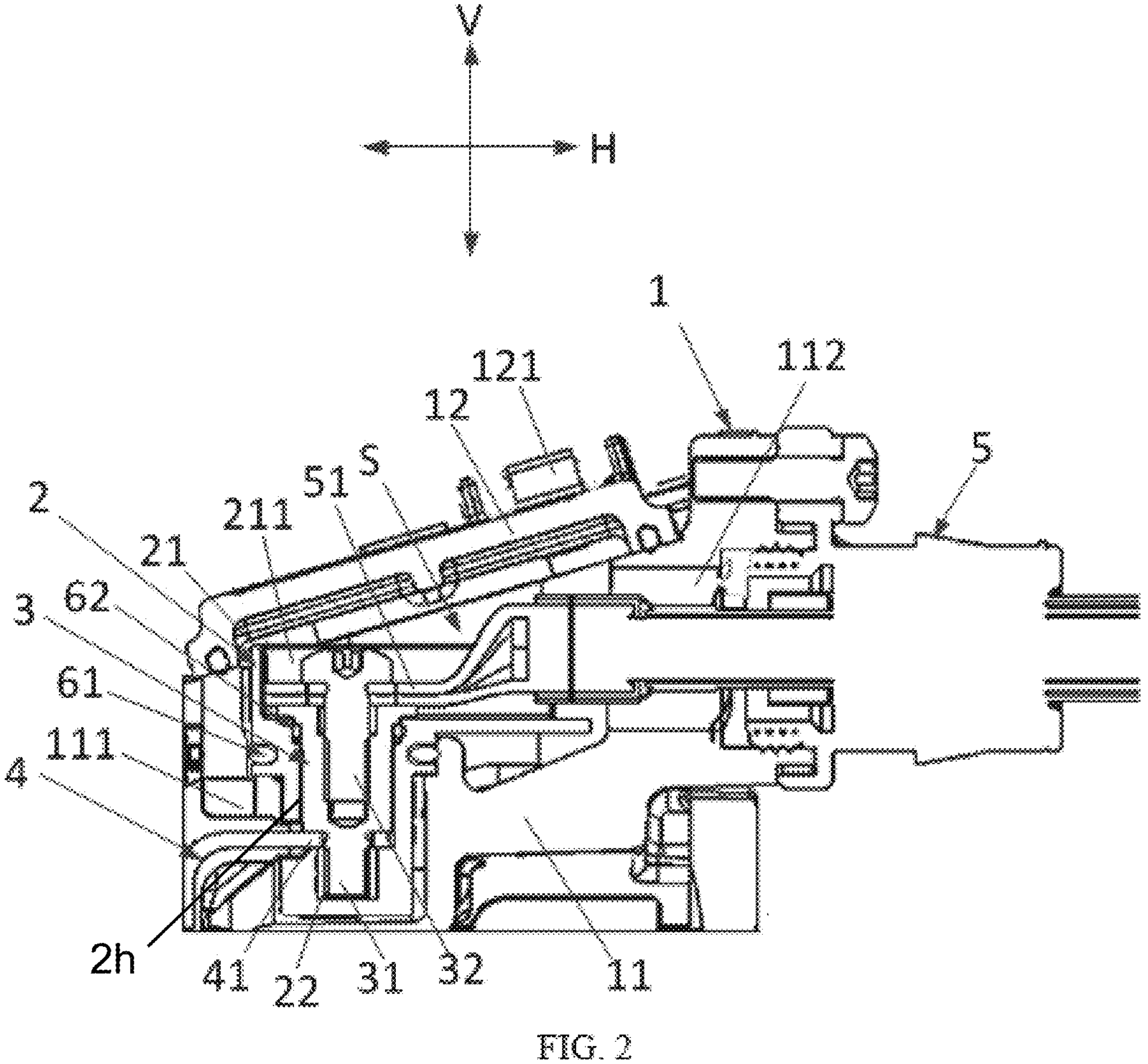
FIG. 2 is a schematic cross-sectional view showing a partial structure of an in-wheel electric motor drive system according to an embodiment of the present application, in which cross-section lines are omitted and an electric connection structure for an electric motor is mainly shown.

As shown in FIG. 2, the in-wheel electric motor drive system according to an embodiment of the present application comprises a housing, a wiring support 2 and connection assemblies 3.

In the present embodiment, similar to the structure described with reference to FIG. 1A in the background art, the housing comprises a housing body and a housing cover 1, the housing body may be formed with a mounting opening open to one side, and the housing cover 1 is fixed to the housing body and closes the opening of the housing body, so that mounting space is formed by surrounding of the housing body and the housing cover 1. As shown in FIG. 2, a wiring cavity S used for realizing an electric connection between electric motor busbars 4 and power supply connectors 5 is formed in the housing cover 1.

The housing cover 1 comprises a cover body 11 and a wiring cavity cover 12. The cover body 11 is provided with an opening enabling the wiring cavity S to open toward the outside, and operations (for example, operating an assembly tool) can be performed via the opening in the assembly process of electrically connecting the electric motor busbars 4 and the power supply connectors 5 together. The wiring cavity cover 12 is mounted on the cover body 11 and can be opened and closed in a controlled mode, thereby enabling the opening to be opened and closed. The wiring cavity cover 12 is further provided with a breather valve 121, and the breather valve 121 can enable, in a controlled mode, the wiring cavity S to be in communication with the external space. Specifically, once the pressure inside the wiring cavity S is too high and exceeds a predetermined value, the pressure in the wiring cavity S can cause the breather valve 121 to open to release the pressure in the wiring cavity S, thereby enabling the pressure in the wiring cavity S to be reduced.

The cover body 11 of the housing cover 1 is also formed with a first channel 111 and a second channel 112. Both the first channel 111 and the second channel 112 are in communication with the wiring cavity S. The first channel 111 allows first connection ends 41 of the electric motor busbars 4 to be inserted into the wiring cavity S. The second channel 112 allows second connection ends 51 of the power supply connectors 5 to be inserted into the wiring cavity S. In the present embodiment, the first channel 111 and the second channel 112 extend along a horizontal direction H, and the first channel 111 and the second channel 112 are staggered by a certain distance in a vertical direction V.

Figure 3A:
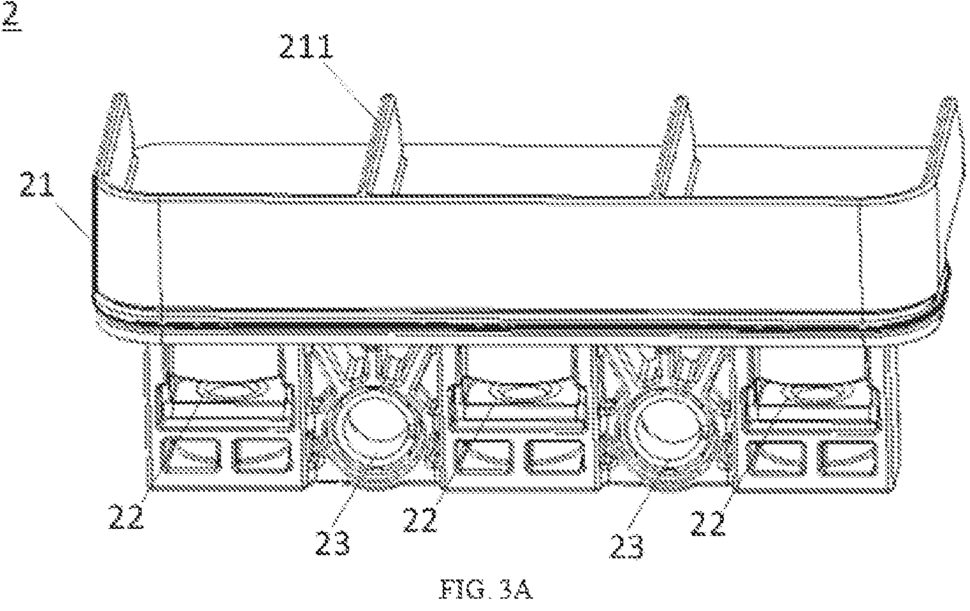
FIG. 3A is a schematic diagram showing a structure of a wiring support in FIG. 2.

In the present embodiment, as shown in FIG. 2 and FIG. 3A, the wiring support 2 is mounted into the wiring cavity S and fixed to the cover body 11. The wiring support 2 is used for supporting and restraining the first connection ends 41 of the electric motor busbars 4, the second connection ends 51 of the power supply connectors 5, and the connection assemblies 3. Specifically, the wiring support 2 comprises a support body 21, first insertion pieces 22 and second insertion pieces 23.

The support body 21 is made of plastic. The upper part of the support body 21 is formed with upper partition walls 211, the upper partition walls 211 divide the upper part of the support body 21 into three areas arranged side by side. In each area, the support body 21 is formed with one mounting hole **2*h*, and each mounting hole 2*h* extends substantially along the vertical direction V. In this way, the wiring support 2 comprises three mounting holes 2*h* arranged side by side. The first insertion pieces 22 are made of metal such as copper, and the first insertion pieces 22 and the support body 21 are integrally formed by insertion molding. The first insertion pieces 22 are located at the bottoms of the mounting holes 2*h* and are formed with internal threaded sections used for being in threaded engagement with the connection assemblies 3. The second insertion pieces 23 are made of metal such as copper. The second insertion pieces 23 and the support body 21 are integrally formed by insertion molding. The second insertion pieces 23 are located between two adjacent mounting holes 2*h*. The second insertion pieces 23 are formed with through holes extending along the horizontal direction H and can form internal threads, so that fixing pieces penetrating through the second insertion pieces 23 can fix the wiring support 2 to the cover body 11**.

In the present embodiment, as shown in FIG. 2, each connection assembly 3 is used for enabling the first connection ends 41 of the electric motor busbars 4 that extend into the mounting holes **2*h* and the second connection ends 51 of the power supply connectors 5 that extends to positions above the same mounting holes 2*h* to realize a stable electric connection. Specifically, each connection assembly 3 comprises a first connecting piece 31 and a second connecting piece 32** which are assembled together.

The first connecting pieces 31 are made of metal such as copper. The first connecting pieces 31 are formed with external threads which are in threaded engagement with the internal threaded sections of the insertion pieces. The first connecting pieces 31 are inserted into the mounting holes **2*h* in a mode of being coaxial with the mounting holes 2*h* and penetrate through the first connection ends 41 of the electric motor busbars 4, and the first connecting pieces 31 are in threaded engagement with the first insertion pieces 22, so that the first connection ends 41 are fixed relative to the wiring support 2, and the first connecting pieces 31 are electrically connected to the first connection ends 41. Here, the first connection ends 41 of the electric motor busbars 4 may have through holes or grooves for the first connecting pieces 31 to penetrate through. The first connecting pieces 31 also have threaded holes that open upward (in the present embodiment, the threaded holes are blind holes), and the second connecting pieces 32 are formed with external threads which are in threaded engagement with the threaded holes. The second connecting pieces 32 penetrate through the second connection ends 51 and are then inserted into the first connecting pieces 31 in a mode of being coaxial with the first connecting pieces 31, and the second connecting pieces 32 are in threaded engagement with the first connecting pieces 31, so as to fix the second connection ends 51 to the first connecting pieces 31 and enable the first connecting pieces 31 to be electrically connected with the second connection ends 51. Here, the second connection ends 51 may have through holes or grooves for the second connecting pieces 32** to penetrate through.

In addition, in the present embodiment, as shown in FIG. 2, the in-wheel electric motor drive system further comprises first sealing rings 61 and second sealing rings 62. The first sealing rings 61 are arranged between the wiring support 2 and the cover body 11, whereby the first sealing rings 61 seal a gap between the wiring support 2 and the cover body 11. The second sealing rings 62 are arranged between the first connecting pieces 31 and the wiring support 2, whereby the second sealing rings 62 seal a gap between the first connecting pieces 31 and the wiring support 2. In this way, space where the drive electric motor is located is isolated from upper space of the wiring cavity S into which the power supply connectors 5 extend, thereby preventing foreign matter from entering the space where the drive electric motor is located in the assembly process.

The assembly process of the electric connection structure for the electric motor of the in-wheel electric motor drive system will be described below.

First, the first sealing rings 61 are mounted on the wiring support 2 in a sleeving mode, then the wiring support 2 is inserted into a predetermined position in the wiring cavity S of the housing cover 1, and the wiring support and the housing cover 1 are fixed together.

Subsequently, the first connection ends 41 of the electric motor busbars 4 are inserted into the wiring cavity S via the first channel 111, and further penetrate through the wiring support 2 to be inserted into the mounting holes **2*h***.

Subsequently, the first connecting pieces 31 with the second sealing rings 62 are inserted into the mounting holes **2*h* and penetrate through the first connection ends 41, and the first connecting pieces are further screwed into the internal threaded sections of the insertion pieces 22, so that the first connection ends 41 are pressed against and fixed to the wiring support 2 by the first connecting pieces 31, and the first connecting pieces 31 and the first connection ends 41** realize a stable electric connection.

Subsequently, the second connection ends 51 of the power supply connectors 5 are inserted into the wiring cavity S via the second channel 112, and further extend to positions above the mounting holes 2*h* of the wiring support 2.

Subsequently, the second connecting pieces 32 are made to penetrate through the second connection ends 51, and are further screwed into the threaded holes of the first connecting pieces 31. The second connection ends 51 are pressed against and fixed to the first connecting pieces 3 by the second connecting pieces 32, and the first connecting piece 31 and the second connection end 51 realize a stable electric connection.

Finally, the wiring cavity cover 12 is closed to complete the entire assembly process.

In this way, since the in-wheel electric motor drive system according to an embodiment of the present application avoids the adoption of separate conductive connecting pieces described in the background art, it can be seen from the above assembly process that the step of adjusting such conductive connecting pieces is omitted, thereby simplifying the assembly process and reducing the mounting cost. Moreover, by adopting the above structure, the overall structure of the electric connection structure is compact, and the space occupied by the electric connection structure itself is reduced.

Figure 3B:
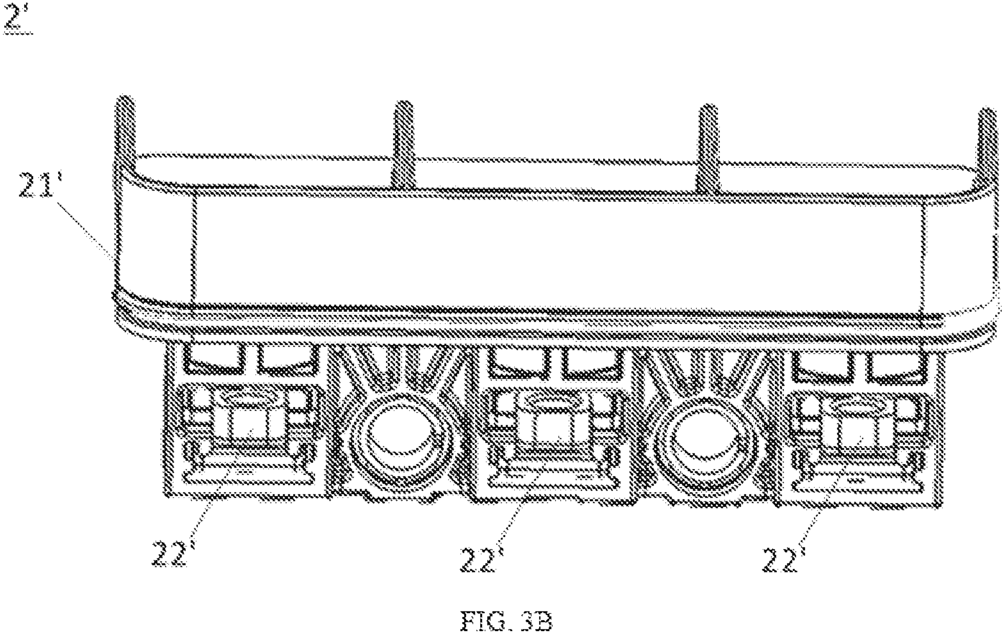
FIG. 3B is a schematic diagram showing a structure of a modified example of the wiring support in FIG. 3A.

The specific embodiments of the in-wheel electric motor drive system according to the present application have been described in detail above, and will be supplemented below.

i. It can be understood that the second connection ends 51 of the power supply connectors 5 may be designed into different sizes and be formed as needed. As in the present embodiment, the second connection ends 51 of the power supply connectors 5 form laminated structures through bending and extend to positions above the mounting holes in the form of such laminated structures, which is beneficial to improve the structure strength of the second connection ends 51.

ii. In the above specific embodiment, the support body 21 of the wiring support 2 and the first insertion pieces 22 are integrally formed by insertion molding, but the present application is not limited thereto. In one modified example of the wiring support 2 shown in FIG. 3B, the support body 21' and the first insertion pieces 22' may also be manufactured separately, and then the first insertion pieces 22' are mounted at predetermined positions of the support body 21'. Specifically, a part of the support body 21' where the bottoms of the mounting holes 2*h* are formed has openings for the first insertion pieces 22' to be inserted therein, so that the first insertion pieces 22' can be inserted into predetermined positions via the openings after the support body 21' is molded. The modified example can realize the same functions and effects as the wiring support 2 described in the above specific embodiment.

iii. In the above specific embodiment, it is described that three mounting holes 2*h* are arranged on the wiring supports 2, 2', and there is one connection assembly 3 corresponding to each mounting hole 2*h* to electrically connect the first connection ends 41 of the electric motor busbars 4 and the second connection ends 51 of the power supply connectors 5 together. The electric connection structures of these three sets of electric motor busbars 4 and power supply connectors 5 correspond to three phases of alternating current, whereby the alternating current is supplied to the electric motor busbars 4 via the power supply connectors 5.

iv. It can be understood that the drive electric motor and its electric motor busbars 4 are a part of the in-wheel electric motor drive system according to the present application, but the power supply connectors 5 may be integrated into the in-wheel electric motor drive system or may also be components independent of the in-wheel electric motor drive system.

The invention claimed is:

1. An in-wheel electric motor drive system, comprising:

a housing formed with a wiring cavity, a first channel, and a second channel, both the first channel and the second channel are in communication with the wiring cavity, the first channel allows first connection ends of electric motor busbars of the in-wheel electric motor drive system to be inserted into the wiring cavity, the second channel allows second connection ends of power supply connectors to be inserted into the wiring cavity, the first connection ends and the second connection ends oriented in the wiring cavity in opposing directions;

a wiring support mounted into the wiring cavity and fixed to the housing, the wiring support is formed with mounting holes;

connection assemblies electrically connecting the first connection ends extending into the mounting holes and the second connection ends extending to positions above a same of the mounting holes together;

first sealing rings arranged between the wiring support and the housing; and second sealing rings arranged between the connection assemblies and the wiring support, the first sealing rings and the second sealing rings hermetically sealing a space where the first connection ends are located and a space where the second connection ends are located.

2. The in-wheel electric motor drive system according to claim 1, wherein the connection assemblies comprise first connecting pieces and second connecting pieces;

wherein the first connecting pieces are inserted into the mounting holes in coaxial with the mounting holes and penetrate through the first connection ends, so as to fix the first connection ends to the wiring support and enable the first connecting pieces to be electrically connected with the first connection ends, wherein the second sealing rings are arranged between the first connecting pieces and the wiring support; and wherein the second connecting pieces penetrate through the second connection ends and are inserted into the first connecting pieces coaxial with the first connecting pieces, so as to fix the second connection ends to the first connecting pieces and enable the first connecting pieces to be electrically connected with the second connection ends.

3. The in-wheel electric motor drive system according to claim 2, wherein the wiring support comprises internal threaded sections located at bottoms of the mounting holes, wherein the first connecting pieces are formed with external threads which are in threaded engagement with the internal threaded sections.

4. The in-wheel electric motor drive system according to claim 3, wherein the wiring support comprises a support body and insertion pieces, wherein the internal threaded sections are arranged in the insertion pieces, wherein the insertion pieces and the support body are integrally formed, or the insertion pieces are manufactured independently of the support body and fixed to the support body.

5. The in-wheel electric motor drive system according to claim 2, wherein the first connecting pieces comprise threaded holes that open upward, wherein the second connecting pieces are formed with external threads in threaded engagement with the threaded holes.

6. The in-wheel electric motor drive system according to claim 1, wherein the first channel and the second channel extend along a horizontal direction, and the mounting holes extend along a vertical direction.

7. The in-wheel electric motor drive system according to claim 1, wherein the housing comprises a housing body and a housing cover, the housing body is formed with a mounting opening open toward one side, and the housing cover is fixed to the housing body and closes the mounting opening of the housing body, so that space for mounting a drive electric motor of the in-wheel electric motor drive system is formed by surrounding of the housing body and the housing cover, and the wiring cavity is formed in the housing cover.

8. The in-wheel electric motor drive system according to claim 7, wherein the housing cover comprises a cover body and a wiring cavity cover, the cover body is provided with an opening which is in communication with the wiring cavity, and the wiring cavity cover is mounted on the cover body and can be opened and closed in a controlled mode, thereby enabling the opening to be opened and closed; and the wiring cavity cover is also provided with a breather valve, and the breather valve can enable, in a controlled mode, the wiring cavity to be in communication with external space.

9. The in-wheel electric motor drive system according to claim 1, wherein the wiring support comprises three mounting holes arranged side by side for enabling three sets of corresponding of the electric motor busbars and the power supply connectors to realize electric connection.

10. An in-wheel electric motor drive system, comprising:

a housing comprising a wiring cavity, a first channel, and a second channel, the first channel and the second channel are in communication with the wiring cavity, the first channel allows for insertion of first connection ends of electric motor busbars of the in-wheel electric motor drive system into the wiring cavity, the second channel allows for insertion of second connection ends of power supply connectors into the wiring cavity, the first connection ends and the second connection ends oriented in the wiring cavity in opposing directions;

a wiring support mounted into the wiring cavity and fixed to the housing, the wiring support comprising a plurality of mounting holes;

a plurality of connection assemblies configured to electrically connect the first connection ends and the second connection ends;

first sealing rings arranged between the wiring support and the housing; and second sealing rings arranged between the plurality of connection assemblies and the wiring support, the first sealing rings and the second sealing rings hermetically sealing a space where the first connection ends are located and a space where the second connection ends are located.

11. The in-wheel electric motor drive system according to claim 10, wherein the plurality of connection assemblies comprises first connecting pieces and second connecting pieces;

wherein the first connecting pieces are inserted into the plurality of mounting holes and penetrate through the first connection ends to fix the first connection ends to the wiring support and enable electrical connection of the first connecting pieces with the first connection ends; and wherein the second connecting pieces penetrate through the second connection ends and are inserted into the first connecting pieces to fix the second connection ends to the first connecting pieces and enable electrical connection of the first connecting pieces with the second connection ends.

12. The in-wheel electric motor drive system according to claim 11, wherein the wiring support comprises internal threaded sections located at bottoms of the plurality of mounting holes, and the first connecting pieces include external threads threaded in engagement with the internal threaded sections.

13. The in-wheel electric motor drive system according to claim 12, wherein the wiring support comprises a support body and insertion pieces, wherein the internal threaded sections are arranged in the insertion pieces.

14. The in-wheel electric motor drive system according to claim 11, wherein the first connecting pieces comprise threaded holes that open upward, and the second connecting pieces are formed with external threads being in threaded engagement with the threaded holes.

15. The in-wheel electric motor drive system according to claim 11, wherein the first channel and the second channel extend along a horizontal direction, and the plurality of mounting holes extend along a vertical direction.

16. The in-wheel electric motor drive system according to claim 10, wherein the housing comprises a housing body and a housing cover, wherein the housing body comprises a mounting opening open toward one side, wherein the housing cover is fixed to the housing body and closes the mounting opening of the housing body.

17. The in-wheel electric motor drive system according to claim 10, wherein the wiring support comprises three mounting holes arranged side by side for enabling electrical connection of three sets of corresponding of the electric motor busbars and the power supply connectors.

18. An electric vehicle, comprising:

an in-wheel electric motor drive system comprising:

a housing comprising a wiring cavity, a first channel, and a second channel the first channel and the second channel are in communication with the wiring cavity the first channel allows for insertion of first connection ends of electric motor busbars of the in-wheel electric motor drive system into the wiring cavity, and the second channel allows for insertion of second connection ends of power supply connectors into the wiring cavity, the first connection ends and the second connection ends oriented in the wiring cavity in opposing directions;

a wiring support mounted into the wiring cavity and fixed to the housing the wiring support comprising a plurality of mounting holes;

a plurality of connection assemblies configured to electrically connect the first connection ends and the second connection ends;

first sealing rings arranged between the wiring support and the housing; and second sealing rings arranged between the plurality of connection assemblies and the wiring support, the first sealing rings and the second sealing rings hermetically sealing a space where the first connection ends are located and a space where the second connection ends are located.

* * * * *